H. P. C. LASSEN.
APPARATUS FOR STORING AND PRESERVING GRAIN.
No. 171,290. Patented Dec. 21, 1875.
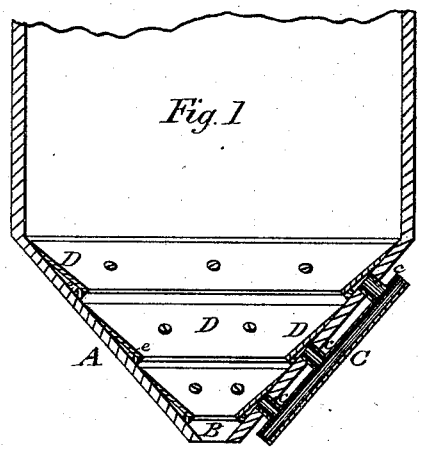
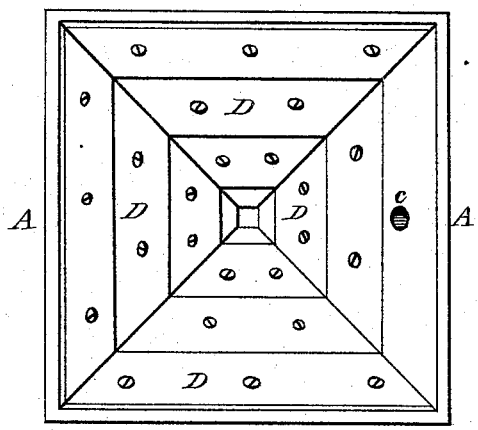

UNITED STATES PATENT OFFICE.

HANS P. C. LASSEN, OF CHICAGO, ILLINOIS.

IMPROVEMENT IN APPARATUS FOR STORING AND PRESERVING GRAIN.

Specification forming part of Letters Patent No. 171,290, dated December 21, 1875; application filed November 2, 1875.

*To all whom it may concern:*

Be it known that I, HANS P. C. LASSEN, of Chicago, in the county of Cook and State of Illinois, have invented certain new and useful Improvements in Apparatus for Storing and Preserving Grain; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a vertical section, and Fig. 2 is a top view, one of the slats D being removed.

Similar letters of reference indicate corresponding parts.

This invention relates to the construction of that class of bins for storing grain which are usually found in elevators and other large grain store-houses; and it consists in the construction and combination of parts hereinafter described, and pointed out in the claims.

In the drawing, A A A A are the sides of the bin, the bottom of which is constructed so as to form a chute, B. One of the sides of this has a series of three or more perforations, arranged in a line from the top of the chute to the bottom. Through these perforations I lead pipes c, projecting slightly on the inside of the chute, and connected on the outside by a main pipe, C. On the inside of the chute B, and projecting over the pipes c, I arrange a series of slats or guards, D, the lower parts of which are made to project, by inserting blocks of wood or other suitable material between them and the inside of the chute B. These are for the purpose of preventing the pipes c, when grain is filled into the bin, from becoming stuffed or choked therewith, and also in order to produce an empty space, e, around these, and continue the same all around the circumference of the chute.

The object of this invention is to preserve and improve the condition of grain in bulk, without involving the necessity of frequently handling and agitating it by manual labor, as is now indispensable in order to preserve and improve its quality, and prevent it from "growing." This I accomplish by leading into the main pipe C a current of dry and cool air, and forcing the same, by means of an air-pump, into the pipes c, empty spaces e, between the guards D and chute B, and out through the mass of grain, which is by this process more thoroughly aerated and agitated than could be done by simply shoveling or "throwing" it.

Having thus described my invention, I claim and desire to secure by Letters Patent of the United States—

In a bin for storing grain, the combination of the chute B with the slats D, forming air-chambers e, pipes c, and main pipe C, constructed and arranged substantially as and for the purpose hereinbefore set forth.

In testimony that I claim the foregoing as my own I have hereunto affixed my signature in presence of two witnesses.

HANS PETER CHRISTIAN LASSEN.

Witnesses:
   W. PETERSEN,
   ROBERT BUEXTEN.